(No Model.)
A. C. T. BAUTAIN.
WAGON BRAKE.
No. 399,471. Patented Mar. 12, 1889.
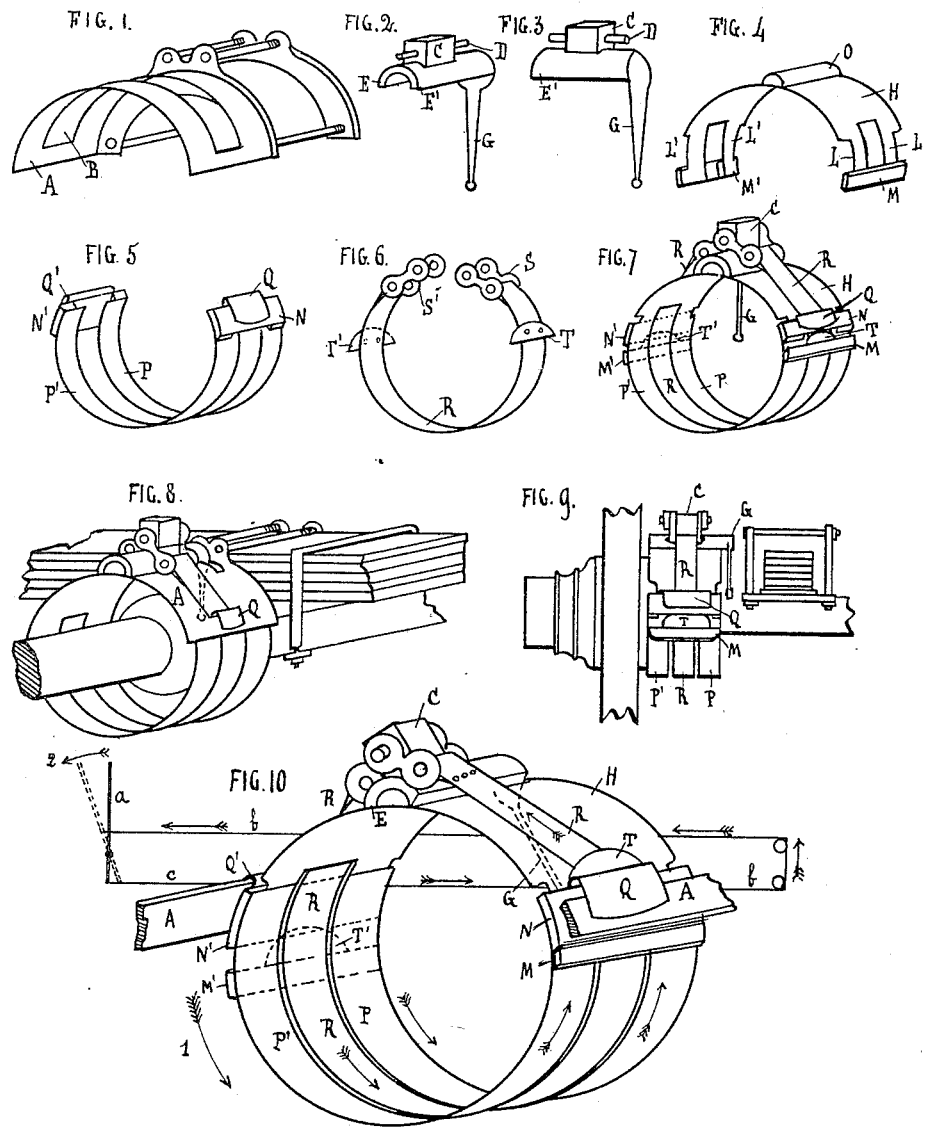
WITNESSES:
INVENTOR:

UNITED STATES PATENT OFFICE.

AUGUSTE CHARLES THEODORE BAUTAIN, OF PARIS, FRANCE.

WAGON-BRAKE.

SPECIFICATION forming part of Letters Patent No. 399,471, dated March 12, 1889.

Application filed December 13, 1888. Serial No. 293,481. (No model.)

*To all whom it may concern:*

Be it known that I, AUGUSTE CHARLES THEODORE BAUTAIN, a citizen of the Republic of France, and a resident of Paris, France, have invented certain Improvements in a Rotative Friction-Brake System, of which the following is a specification.

My invention relates to a double-acting brake-system—that is to say, a system such that the brake may be applied to a vehicle drawn either forward or backward, or even in such cases as the vehicle slipping back down an incline or the horses backing. The brake acts directly upon the hub of the wheels, but its action may be transmitted to a brake-block bearing on the tire of the wheels. It may be applied either to vehicles of two or four wheels, to carts, carriages, vans, tramways, railway-carriages, omnibuses, &c.

In order that my invention and the manner in which it may be executed may be clearly understood, I shall now refer to the accompanying drawings, in which—

Figure 1 represents a perspective view of a curved sheet-iron plate, to be called the "stopping plate;" Fig. 2, a perspective view of a block acting as a fulcrum; Fig. 3, a back view of the latter; Fig. 4, a perspective view of the part of my brake upon which the block is placed. Fig. 5 is a perspective view of the friction-band. Fig. 6 is a perspective view of the draft-band. Fig. 7 is a perspective view of the various parts of my brake fitted together. Fig. 8 represents my brake placed in the retaining-plate, the wheel not yet being in position. Fig. 9 is a front view of my brake applied to a wheel. Fig. 10 is an enlarged view of my brake system, showing the working.

The same letters of reference indicate corresponding parts in all the figures.

A, Fig. 1, is a sheet-iron or other metallic plate with an opening, B, in its central part. This plate is fastened by bolts or otherwise to the springs or to the axle of the vehicle. It must be made firm, and will be hereinafter referred to as the "retaining-plate."

C is a steel or cast-iron block, traversed in its upper part by a pin, D, and the lower part of which is semi-cylindrical in form, having sides or feet E E'. A lever, G, is cast in one piece with the block or riveted upon it.

H, Fig. 4, is a bent sheet-iron plate, terminating at each end in fingers L L and L' L', which are coupled together by small plates M M'. In the central part of this plate H there is a half-cylinder, O, riveted on the plate or cast in one piece with it.

P P', Fig. 5, are two curved sheet-iron bands, joined at their ends by plates N N', riveted upon them, such plates being hollow in the middle in order to leave a way or passage between them and the bands P P'. Upon these plates there are cramps Q Q'.

R, Fig. 6, is a draft-band, also of sheet-iron, its width being equal to the width between the bands P P'. This band R is provided at each end with ears S S'.

T T' are stops.

To fit my brake together, I proceed as follows: I place the block C to ride upon the half-cylinder O of the band H. (See Figs. 7 and 10.) I then introduce the fingers L L and L' L' of the band H in the ways N N' and rivet the plates M M' to their ends. The band H cannot then be separated from the friction-bands P P'. I afterward place the draft-band R in the space left between the two bands P P', and I pass one of its ends between the fingers L' L' and the other between the fingers L L of the band H, Fig. 4, in such manner that the pin D of the block C may be placed in the ears S S', as seen in Figs. 7 and 10. The stops T T' are intended to strike against the plates M M' and stop the draft-band R. My brake being then completed, I place it in the opening B of the retaining-plate A, Fig. 8, in such manner that the cramps Q Q' shall catch in the ends of the opening B. I afterward mount the wheel upon the axle, and the hub fits exactly in the circle formed by the various parts of my brake, as will be seen in Fig. 9. This hub is of wood, and at the part where the friction takes place wooden pins are driven vertically into it. This increases its resisting-power considerably, while diminishing the wear, for the friction takes place directly upon the wooden pins.

Such is the general arrangement of my brake system, of which I shall now proceed to explain the working. For this purpose, and in order to make my explanation more clearly understood, I have only shown in Fig. 10 the working parts of the brake, and they are drawn to a larger scale. The arrow 1 shows the direction in which the wheel turns. When the driver wishes to stop, he pulls the lever $a$ in the direction shown by arrow 2, upon which the lever assumes the position shown in dotted lines. By this movement the rope $b$ is drawn tight, the cord $c$ slackened, and the lever G brought to the position represented in dotted lines, and as such lever is formed in one piece with the block C the latter turns round the side or foot E, and by this movement tightens the draft-band R. The stop T' then strikes against the plate M', which draws with it the band H, and consequently the opposite plate, M, which then strikes against the edge of the plate N. By such means the latter is drawn round, as are also the two bands P P', riveted upon it. All the parts of my brake tend, therefore, to turn round the hub of the wheel; but the cramp Q', which catches in the opening B of the retaining-plate A, (which is fixed firmly,) stops such movement and causes the brake to bind. It will, in fact, be understood that the more power is applied to the lever G the more violently will the brake bind, such binding-pressure only ceasing with the stoppage of the wheel or the release of the lever. This binding-pressure is, moreover, almost instantaneous. The stoppage in the contrary direction—viz., when the vehicle is moving backward—is effected by working the lever in the opposite direction, when results exactly similar to those above described will be obtained, but reversely. My brake may, moreover, be constructed in various other ways to suit different cases, and the block C may be placed above or underneath the hub, as may be most desirable to meet the requirements of the different classes of vehicles to which it is to be applied. It may be worked by the driver by means of a treadle, lever, or other suitable medium. I may even contrive a kind of catch, by which it may be made self-acting on the fall of a horse or any sudden stoppage. I can, likewise, isolate each separate part of my brake system by any suitable incombustible material; or to deaden the noise I can apply leather or other suitable material wherever desirable.

What I claim, and desire to secure by Letters Patent, is—

1. The combination, in a friction-brake for vehicles, of the retaining-plate A, the curved plate H, the block C, having a lever, G, and adapted to rock on the curved plate, the friction-bands P P', having cramps Q Q', the draft-band R, connected at its ends with the rocking block, and means for operating the lever, substantially as described.

2. The combination, in a friction-brake for vehicles, of a stationary retaining-plate, A, having a slot, B, a curved plate, H, having separated fingers connected by end plates M M', rocking block C, supported by the curved plate and having a pin, D, and a projecting lever, G, the separated friction-bands P P', connected by end plates N N', provided with cramps Q Q', the draft-band R, located between the friction-bands provided with stops T T', and having end links, S S', connected with the pin of the rocking block, and means for operating the lever of the rocking-block, substantially as described.

3. The combination, in a friction-brake, of a retaining-plate, A, a curved plate, H, having end plates M M', a rocking block, C, the friction-bands P P', having end plates N N', the draft-band R, between the friction-bands, connected at its ends with the rocking block, and means for operating the block, substantially as described.

In testimony whereof I have signed my name to this specification in the presence of two subscribing witnesses.

AUGUSTE CHARLES THEODORE BAUTAIN.

Witnesses:
GOINBARD BONNEVILLE,
CH. BROWN.